Jan. 28, 1947. S. TOBEY ET AL 2,414,987

EXPANSION JOINT

Filed Oct. 13, 1944 5 Sheets-Sheet 1

Inventor
SOLOMON TOBEY
JOHN J. MANK
SOL ZALLEA
By Lee Edelson
Attorney.

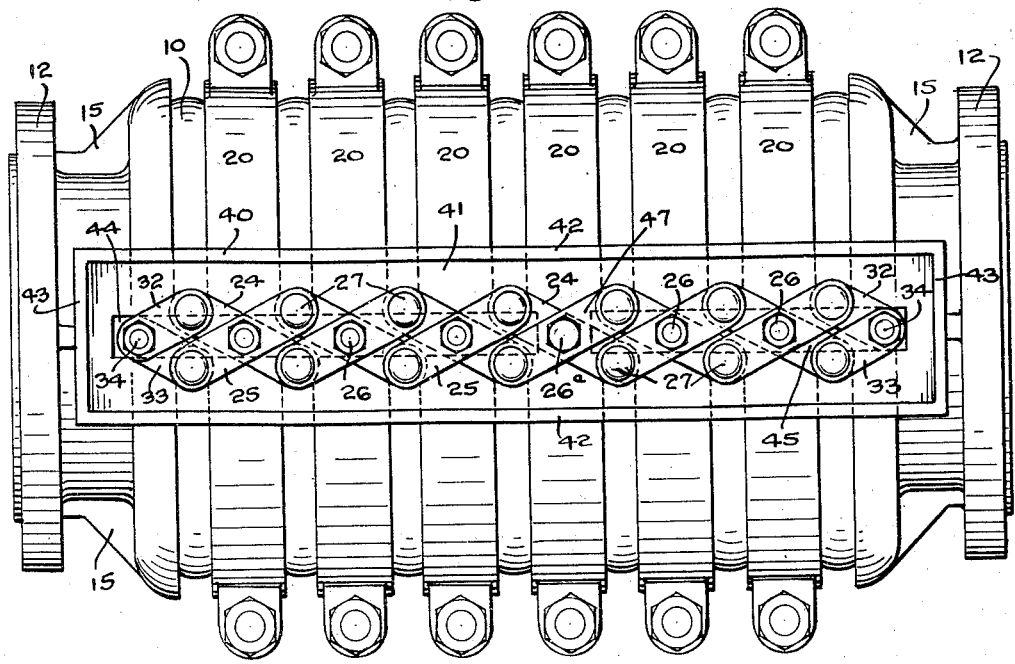
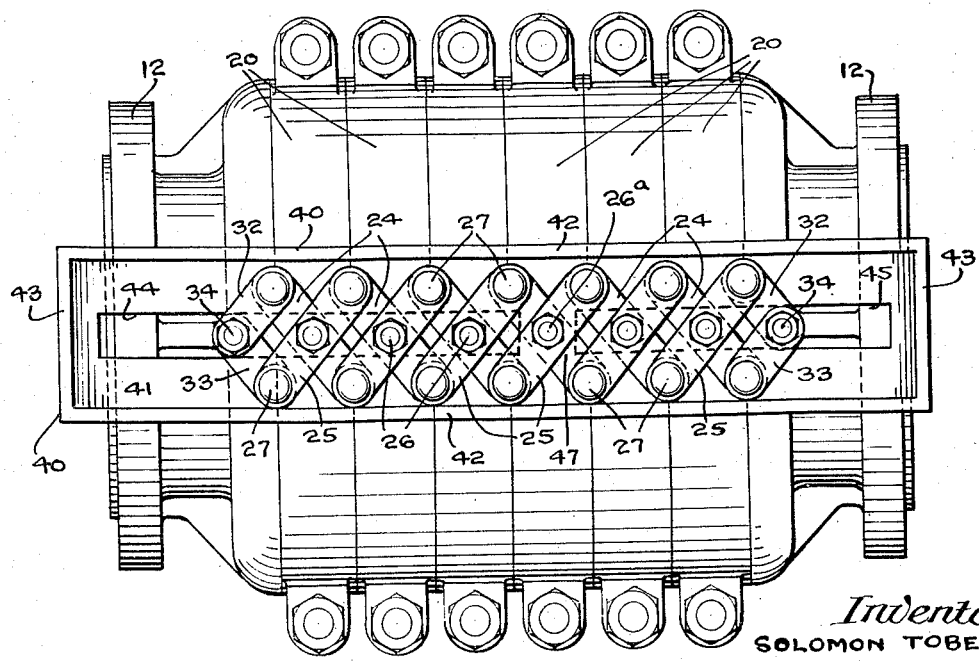

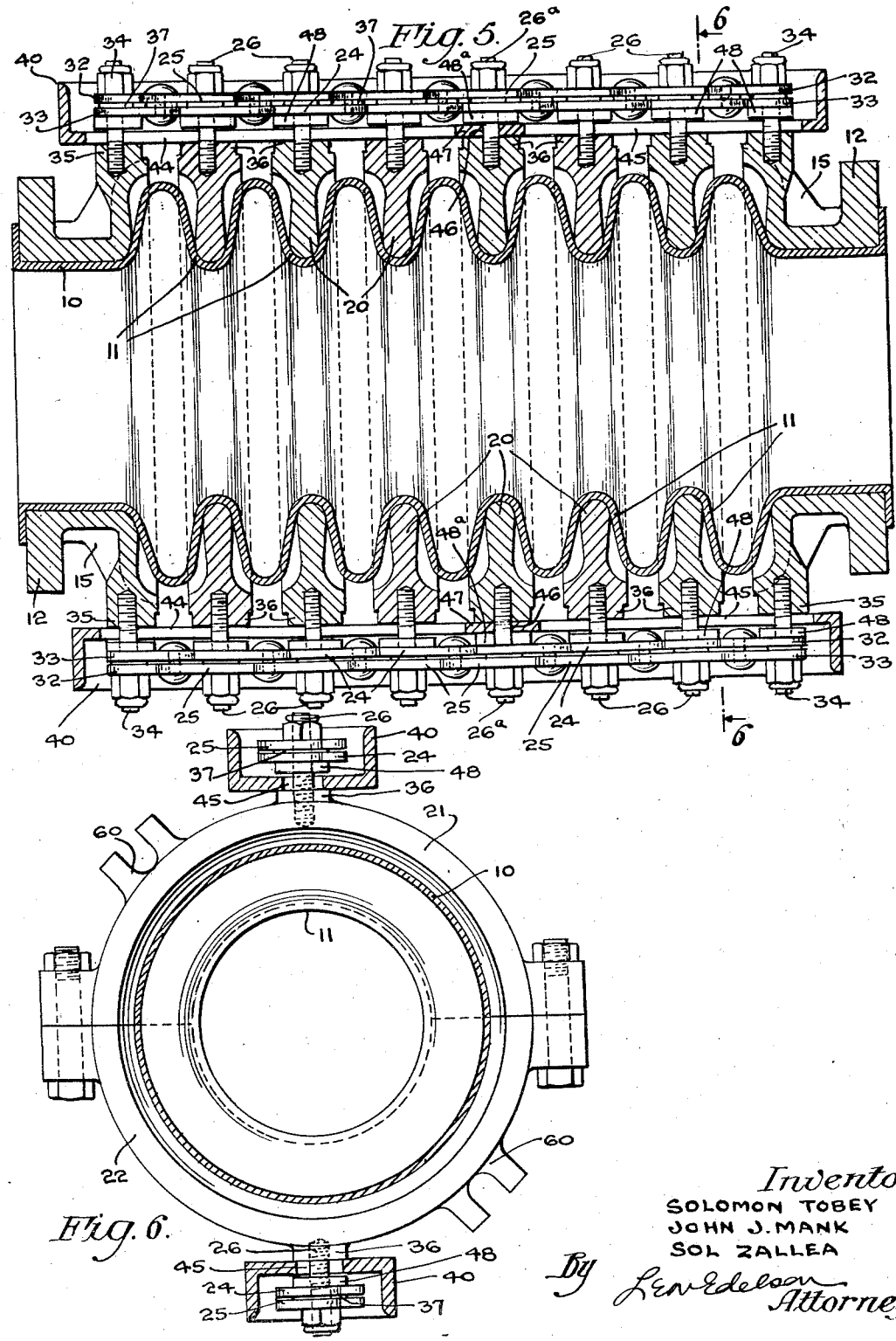

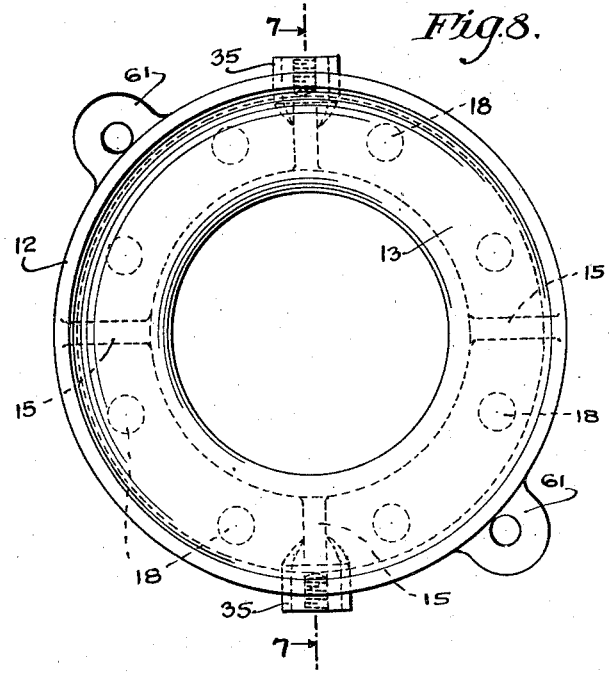
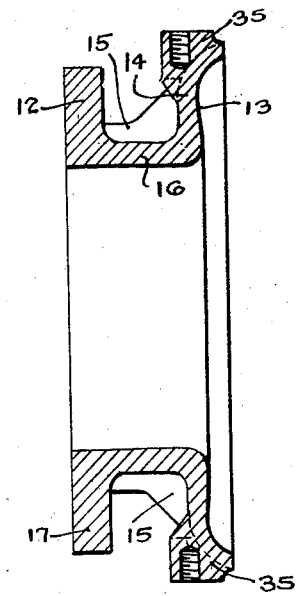
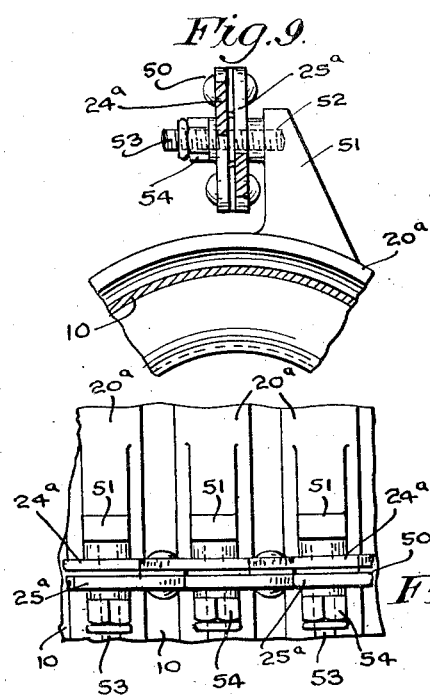
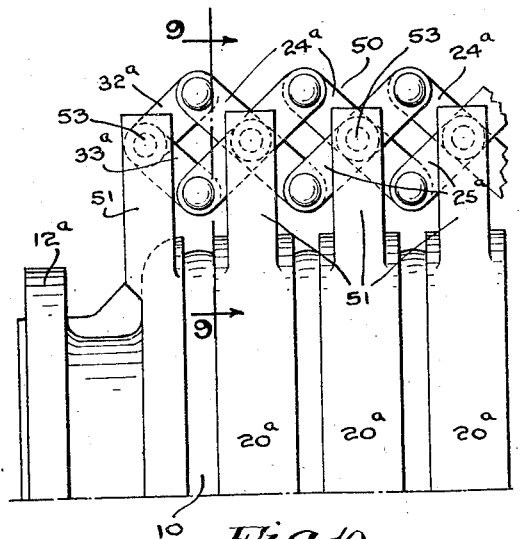

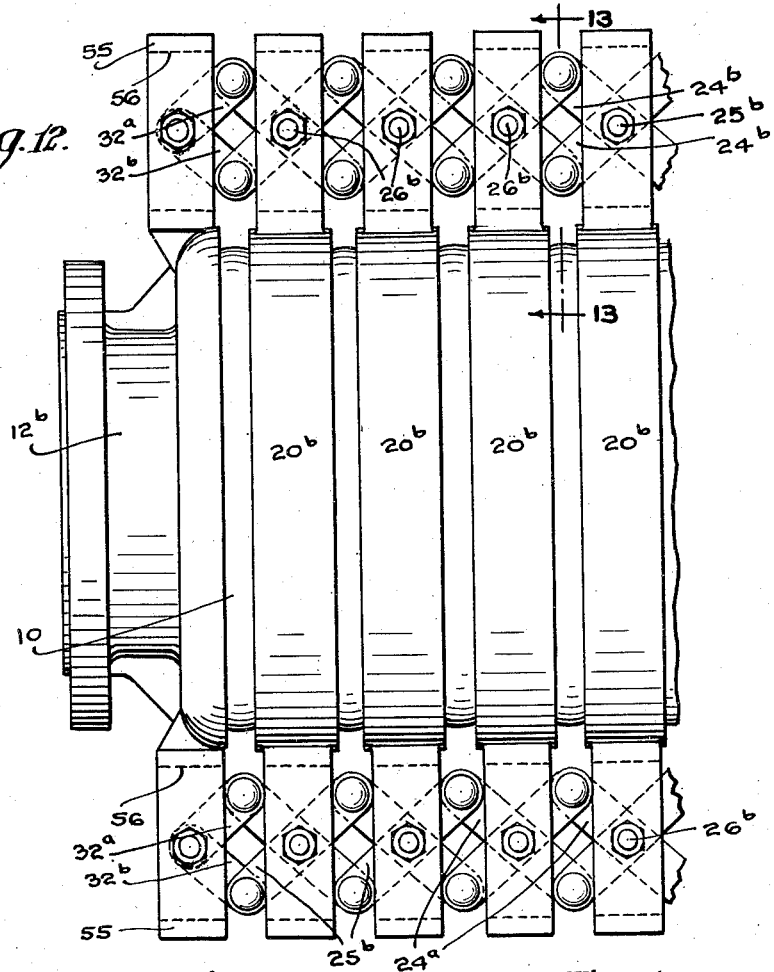
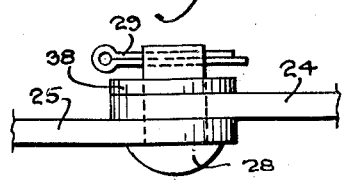
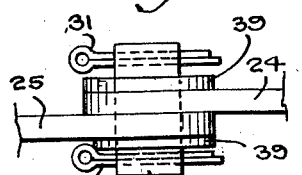
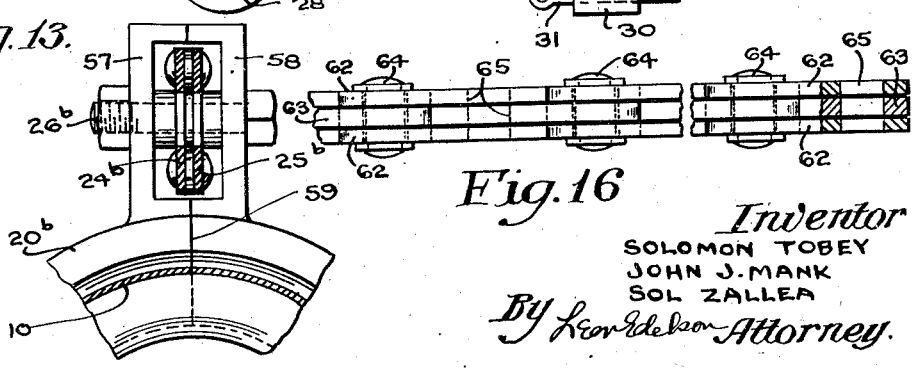

Patented Jan. 28, 1947

2,414,987

UNITED STATES PATENT OFFICE 2,414,987

EXPANSION JOINT

Solomon Tobey, Camden, N. J., and John J. Mank, Newark, and Sol Zallea, Wilmington, Del., assignors to Zallea Brothers & Johnson, Wilmington, Del., a partnership consisting of James P. Zallea, Sol Zallea, and Herbert G. Johnson Application October 13, 1944, Serial No. 558,556

14 Claims. (Cl. 285—90)

1

This invention relates to expansion joints adapted to compensate for changes in length of steam, air, water and other pipe lines where such changes in length are produced by temperature changes.

These joints ordinarily comprise an inner tube of corrugated metal to the opposite ends of which are respectively secured a pair of flanged end rings or welding nipples for securing the joint in the pipe line. While various devices have heretofore been employed for preventing the collapse of the corrugated inner tube when subjected to compressive forces as well as to prevent excessive expansion or elongation of the tube when it is subjected to tension, none of them have been entirely effective for the reason that none of such known devices adequately insure equal and uniform distribution of the strains and stresses simultaneously throughout all of the several corrugations of the tube. In consequence of this, although the overall expansion and contraction of the tube may have been confined to within predetermined limits, one or more of the individual corrugations still may be contracted or expanded to greater extent than others with the result that such corrugations are subjected to increased stresses and strains which so weaken them as to ultimately cause collapse of the tube in the zone or zones of such weakened corrugations.

Having in mind the foregoing, it is among the principal objects of the present invention to provide an expansion joint wherein the strains and stresses to which the joint is subjected during expansion and contraction thereof are uniformly and equally distributed simultaneously through the several corrugations of the inner tube of the joint, the arrangement being such that the joint is truly self-equalizing during either expansion or contraction thereof to the end that each of the several tube corrugations is subjected to the same degree of expansion or contraction, thereby preventing disproportionate flexing of one or more corrugations with respect to the others.

More specifically, it is an object of the present invention to provide a simple, compact and relatively inexpensive but highly efficient expansion joint having means operative on the principle of the pantograph for automatically insuring equal and uniform flexing of each corrugation of the inner tube when the joint is subjected to either expansion or contraction, all without regard to the number of corrugations employed in the tube and without decreasing the flexibility thereof.

2

Other objects of the invention and advantages resulting therefrom will appear more fully hereinafter, it being understood that the present invention consists in the combination, construction, location and relative arrangement of parts, all as will be described more fully hereinafter, as shown in the accompanying drawings and as finally pointed out in the appended claims.

In the said accompanying drawings, which show certain preferred embodiments of the present invention:

Figures 3 and 4 are views similar respectively to Figures 1 and 2 but showing an arrangement including a housing for the equalizing links;

Figure 5 is a longitudinal sectional view of the joint shown in Figure 3;

Figure 6 is a sectional view taken on the line 6—6 of Figure 5;

Figure 7 is a sectional view of one of the end rings of the expansion joint as taken on the line 7—7 of Figure 8;

Figure 8 is an elevational view of the end ring;

Figure 9 is a partial sectional view, taken on the line 9—9 of Figure 10, showing a modified construction of the self-equalizing expansion joint;

Figure 10 is a partial elevational view taken of said modified form of joint;

Figure 11 is a partial top plan view of the joint shown in Figure 10;

Figure 12 is a partial elevational view of another modified form of construction;

Figure 13 is a partial sectional view taken on the line 13—13 of Figure 12; and

Figures 14, 15 and 16 are views showing alternative arrangements of the pantograph equalizing links.

Figure 1:
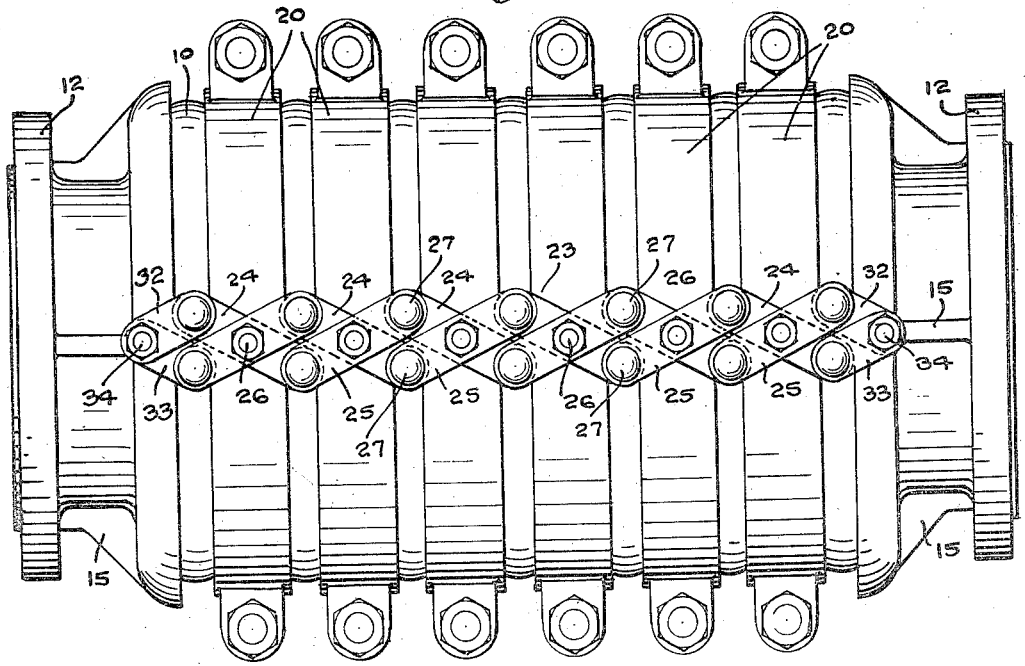
Figure 1 is an elevational view of an expansion joint constructed in accordance with and embodying the principles of the present invention and showing the same in its fully extended condition.

Referring now to the drawings, it will be observed that the expansion joint as constructed in accordance with the present invention comprises an inner tube 10 of copper or other suitable metal, this tube being provided with a plurality of uniformly formed, axially spaced corrugations 11, the depth and number of which may be varied as desired depending upon the degree of expansion which may be required of the joint in a particular installation. Suitably secured to the opposite ends of the corrugated tube 10 are the conventional welding nipples or end rings for bolting or otherwise securing the joint in the pipe line, a preferred form of end ring being shown in Figures 7 and 8.

Preferably, these end rings 12 are each of substantially channel-shaped cross-section with the exposed surface 13 of the inner wall portion 14 of each ring arcuately shaped to a depth sufficient to properly accommodate the immediately adjoining end corrugation 11. In order to adequately strengthen the end securing rings 12—12, it is preferable to provide each with a plurality of integrally formed ribs 15 extending between the inner and outer walls of the channeled ring, said ribs extending radially of the annular basal wall portion 16 of the ring. The outer portion 17 of each is preferably provided with a series of circumferentially spaced bolt holes 18 through which securing bolts (not shown) may be projected for securing the joint in the line.

Supplementing the end rings 12, each of which is in the form of a circumferentially continuous annulus, are a plurality of equalizing rings 20, one of the latter being fitted between each adjoining pair of corrugations 11 of the inner tube. Each of these equalizing rings 20 comprises a pair of semi-circular sections 21 and 22, the ends of which are adapted to be connected together to constitute in effect a circumferentially continuous ring for controlling and limiting the expansion and contraction of the joint, in the manner well understood in the art and as described more fully in the prior United States patent to James P. Zallea, No. 1,971,928, granted August 28, 1934. Also, as described in said prior patent, the equalizing rings 20 each may be provided with a pair of diametrically opposed bifurcated lugs or bosses 60—60, each longitudinally alined set of which receives an alining rod (not shown herein), the opposite ends of which project through suitably apertured bosses 61—61 integrally or otherwise formed on the end rings 12 (see Figure 8). The operation and function of these alining rods is more particularly described in the prior Patent No. 1,971,928 aforesaid.

While these equalizing rings 20 are satisfactorily operative to prevent the utter collapse under compression of any one or more of the corrugations, they are not in themselves sufficient to insure that all of the corrugations simultaneously flex uniformly and to the same degree when the pipe line in which the joint is installed is subjected to temperature changes which cause the expansion joint to expand or contract as the case may be. For example, it is entirely possible that under certain conditions a particular corrugation may be elongated under tension or contracted under compression to greater extent than the other corrugations with the result that such corrugation eventually weakens and gives way so as to seriously impair, if not entirely destroy, the efficiency of the joint. Such a condition may arise because of an inherent weakness in one or more of the corrugations resulting from the fact that in forming the corrugated tube such stretching of the metal may have occurred as to render certain corrugations of reduced wall thickness in their flexing zones. Obviously, repeated excessive flexing of any such weakened corrugation results in premature rupture of the joint, the equalizing rings 20 being not adapted in themselves to prevent such excessive and disproportionate flexing in any one corrugation.

To overcome this possibility of failure of the joint and to insure that all corrugations simultaneously flex uniformly and to the same degree during either expansion or contraction of the joint, we provide the joint with a linkage operative on the principle of the pantograph for distributing each increment of axial change in the overall length of the joint equally among the several corrugations 11 of the inner tube. Thus, if the overall increase or decrease in length of a tube having seven corrugations (e. g. Figure 3) is 1¾ inches, the pantograph linkage system of the present invention will so distribute this variation in overall length among the several corrugations that each of the latter will be axially elongated or axially contracted, as the case may be, to the extent of ¼ inch. Consequently, no one corrugation is subject to excessive and disproportionate variations in axial length and, therefore, the operating life of the joint is greatly prolonged.

Figure 2:
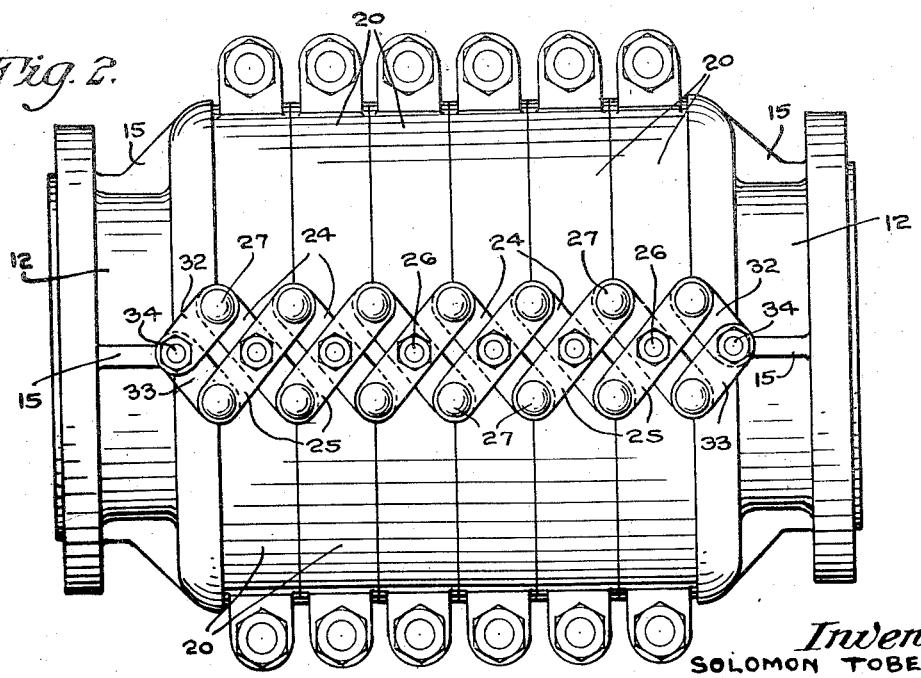
Figure 2 is a similar view showing the joint in its fully contracted condition.

Referring now more particularly to Figures 1 and 2, it will be noted that the pantograph linkage system, designated generally by the reference numeral 23, essentially consists of a plurality of pairs of links 24—25, the central points of each pair of which are pivotally secured together and to each of the equalizer rings 20 by a suitable stud 26. As clearly appears in Figure 1, the ends of the links 24 overlap and are pivotally secured to the adjacent ends of the links 25 by any suitable means, such as the rivets 27 of Figures 1 to 5, inclusive, the headed pins 28 of Figure 14 through the shanks of which are projected the anchoring cotter pins 29, the straight shank pins 30 of Figure 15 through the opposite ends of which are projected the anchoring cotter pins 31, or the shoulder type rivet of Figure 16.

In addition to the several pairs of links 24—25 so pivotally secured to each of the equalizer rings 20, a pair of half-length links 32—33 is pivotally secured, as at 34, to each of the end rings 12 of the joints, the free ends of these half-length links being pivotally secured in overlapping relation to the adjacent ends of the endmost pairs of the links 24—25.

To facilitate adequate securement of the linkage system in operative association with the end and equalizer rings of the joint, each of such rings is formed in its peripheral surface with an interiorly threaded boss for reception of the pivot studs 26. In the case of the end rings such boss is designated 35 (see Figures 7 and 8), while in the case of the intermediate equalizer rings the said bosses are designated by the reference numeral 36 (see Figures 5 and 6).

Preferably, although not necessarily, each joint is provided with a pair of such pantograph linkages extending lengthwise of the joint and at diametrically opposite sides thereof, thereby better insuring equal distribution of the linear variations of the joint throughout its circumferential extent. In certain installations requiring larger size joints, a plurality of such linkage systems may be provided arranged in circumferentially spaced, substantially parallel relation with respect to the longitudinal axis of the joint.

If desired, the several pairs of intermediate links 24 and 25 as well as the pairs of end links 32—33 may be separated somewhat from each other by interposed washers 37 fitted about the shanks of the relatively movable pivot pins 26 and the pivotal studs 27 fixedly secured to the annular external rings of the joint. However, these intermediate spacer washers are dispensable, as is illustrated, for example, in Figures 14 and 15 wherein the links are arranged in flatwise engagement with each other. In the latter arrangements, there may be employed an external washer 38 as in Figure 14, or a pair of external washers 39—39, as in Figure 15.

It will be apparent that in the joint constructed as just described with one or more sets of pantograph linkages, any variation in the overall length of the joint will be uniformly and equally distributed simultaneously throughout all of the equalizer rings 20, each of these rings being axially displaced to the same degree with respect to each other and the end rings 12—12. By so insuring simultaneous uniform axial displacement of the several external rings of the joint, the said rings serve to control the flexing of the corrugations of the inner tube and consequently prevent excessive and disproportionate flexing of any one or more of the said corrugations. There is thus provided in the joint of the present invention means for insuring maximum and uniform control in the flexing of each corrugation during both expansion and contraction of the joint.

While the pantograph linkages of the joint serve effectually in themselves to limit the maximum permissible elongation of the joint, as when such linkage is fully extended as shown in Figure 1, it may be desirable in certain instances to provide auxiliary means for limiting the elongation of the joint and so prevent any possibility of the links becoming bound due to possibly over-extending the same. Such auxiliary means may be in the form of the limiting rods (not shown herein) which extend through the alined bosses 60 and 61 of the several external rings of the joint, as more particularly described in the aforementioned prior Patent No. 1,971,928, or it may be in the form of the device which is illustrated more particularly in Figures 3 to 6 wherein it will be observed that each system of linkages, shown arranged at diametrically opposed sides of the joint, is housed within a box-like enclosure 40 of rectangular shape having a bottom wall 41, opposite longitudinally extending side walls 42—42 and opposite end walls 43—43.

The bottom wall 41 of said enclosure is provided with a pair of longitudinally spaced, elongated slots 44 and 45 through which freely project all but one of the pivot studs 26. The one pivot stud (designated 26ª) which does not project freely through one or the other of said slots, projects instead through an opening 46 formed in the intermediate unslotted portion 47 of the base wall 41 of the enclosure and through the intervention of the nut 48ª on said stud securely fastens the enclosure in fixed relation to the equalizer ring 20ª immediately associated with the stud 27ª. The inner nuts 48 on the remaining studs 26 are relatively free of the base wall of the enclosure, and it will be apparent that upon elongation of the joint, the outer extremities of the slots 44—45 in each enclosure 40 respectively engage the opposite endmost studs 26 and so limit to predetermined degree the permissible overall elongation of the joint.

In addition to this function of limiting the permissible elongation of the joint, the slotted enclosure 40 also serves to prevent any tendency of the joint to twist angularly about its longitudinal axis by maintaining the pivot studs 26 in longitudinal alinement and substantially parallel to said axis, as well as to support the joint against any tendency to sag or buckle. Furthermore, the said enclosures 40 each provide a means for securing a protective cover (not shown) over the linkage system and so maintain the same free of any accumulation of dirt and the like which may interfere with its free operation.

Figures 9 to 11, inclusive, illustrate a modified arrangement of the joint equipped with the pantograph equalizing linkage of the present invention. In this modified arrangement, the linkage system 50 is disposed so that it generally lies in a plane extending substantially diametrically of the joint instead of substantially tangentially as in the arrangements of Figures 1 to 6. In this modified arrangement, the external annular rings, both the end rings 12ª and the intermediate equalizer rings 20ª, are each provided with integral radially extending supporting elements 51 for the equalizing links 24ª—25ª and 32ª—33ª. Each of these supporting elements 51 is transversely tapped, as at 52, to receive the central pivot studs 53 of the linkage system, the latter being secured in place upon said studs by the outer nuts 54. In all material respects, the operation of the arrangement of Figures 9 to 11 is similar to that previously described.

Figures 12 and 13 illustrate still another arrangement wherein the linkage systems are disposed substantially in planes extending diametrically of the joint. In this arrangement, however, both sides of the linkage system are supported by elements extending radially of the external annular rings of the joint, these supports being formed preferably as integral parts of the said rings. Thus, the end rings 12ᵇ are each provided with radially extending members 55 transversely slotted, as at 56 in the direction axially of the joint to receive therewithin the outer extremities of the endmost links 32ᵇ—33ᵇ of the linkage system. The intermediate links 24ᵇ—25ᵇ of said system are embraced between mating pairs of channeled members 57—58 respectively formed as integral parts of each half of the intermediate equalizer rings 20ᵇ, these latter rings being each preferably split along the line 59 as shown in Figure 13. The same pivot studs 26ᵇ which serve as the central pivots for the linkage system also serve in this case as the means for bolting together the two halves of each intermediate equalizer ring. As in the case of the previously described modifications, this last arrangement functionally operates in similar manner to simultaneously equalize the axial movements of the several equalizer rings with respect to each other.

Of course, the present invention is not limited to any particular arrangement of the pantograph linkage. For example, in addition to the various arrangements thereof as hereinbefore described, each linkage system may be of the form shown in Figure 16 wherein a pair of external links 62—62 is employed in embracing relation to a single internal link 63, the double links 62—62 being in each instance pivotally secured at their corresponding ends, as by the rivets 64, to the end of an adjoining single link 63, suitable registering apertures 65 being provided in the intersecting portions of the links for reception of the pivot studs carried by the equalizing rings. In this latter arrangement of the pantograph linkage system, the rivets 65 and the main pivot studs are in double shear and so provide for a linkage system having less tendency to twist in the plane of its operation.

In the foregoing description and in the accompanying claims, it will be understood that by expansion and contraction or compression of the joint is meant an axial elongation or shortening thereof, as distinguished from variations in the diameter thereof. Also, it is to be understood that the present invention is susceptible to various changes and modifications other than those specifically disclosed herein, and it is accordingly intended to claim the same broadly, as well as specifically, as indicated by the appended claims.

What is claimed as new and useful is:

1. In an expansion joint of the character having a corrugated, flexible tube and a plurality of external rings respectively fitted within the tube corrugations to limit the permissible contraction and expansion of said tube, means interconnecting said external rings and operative to automatically proportion variations in overall length of the tube equally throughout the several corrugations thereof whereby each corrugation varies in its permissible contraction or expansion in inverse ratio to the total number of corrugations of the tube.

2. In an expansion joint of the character having a corrugated, flexible tube and a plurality of external rings respectively fitted within the tube corrugations to limit the permissible contraction and expansion of said tube, means interconnecting said external rings and automatically operative upon relative axial movement between a pair of adjoining rings to positively effect substantially equal relative axial movement between each pair of adjoining rings.

3. In an expansion joint of the character having a corrugated, flexible tube and a plurality of external rings respectively fitted within the tube corrugations to limit the permissible contraction and expansion of said tube, means operatively associated with said external rings for automatically proportioning variations in overall length of the tube equally throughout the several corrugations thereof whereby each corrugation partakes of a variation in length inversely proportional to the total number of corrugations of the tube.

4. In an expansion joint of the character having a corrugated, flexible tube and a plurality of external rings respectively fitted within the tube corrugations to limit the permissible contraction and expansion of said tube, means operatively associated with said external rings for automatically distributing variations in overall length of the tube equally throughout the several corrugations thereof, said means including a pantograph system of links having a plurality of central pivots spaced longitudinally along the length of the joint and secured respectively to the several external rings thereof.

5. In an expansion joint of the character having a corrugated, flexible tube and a plurality of external rings respectively fitted within the tube to limit the permissible contraction and expansion of said tube, means operatively associated with said external rings for automatically distributing variations in overall length of the tube equally throughout the several corrugations thereof, said means including a pantograph system of links each crossed pair of which is pivotally secured to one of said external rings of the joint.

6. In an expansion joint of the character having a corrugated, flexible tube and a plurality of external rings respectively fitted within the tube to limit the permissible contraction and expansion of said tube, means operatively associated with said external rings for automatically distributing variations in overall length of the tube equally throughout the several corrugations thereof, said means including a plurality of interconnected pairs of links uniformly arranged in intersecting relation, each crossed pair of said links being provided with a central pivot mounted upon one of said external rings.

7. In an expansion joint of the character having a corrugated, flexible tube and a plurality of external rings respectively fitted within the tube corrugations to limit the permissible contraction and expansion of said tube, means interconnecting said external rings and operative to uniformly distribute variations in overall length of the tube equally throughout the several corrugations thereof, said means including a pantograph system of interconnected links disposed generally in parallel relationship to a plane tangential to the cylindrical surface of the joint.

8. In an expansion joint of the character having a corrugated, flexible tube and a plurality of external rings respectively fitted within the tube corrugations to limit the permissible contraction and expansion of said tube, means interconnecting said external rings and operative to uniformly distribute variations in overall length of the tube equally throughout the several corrugations thereof, said means including a pantograph system of interconnected links disposed generally in a plane extending radially of the joint.

9. In an expansion joint of the character having a corrugated, flexible tube and a plurality of external rings respectively fitted within the tube corrugations to limit the permissible contraction and expansion of said tube, means interconnecting said external rings and operative to uniformly distribute variations in overall length of the tube equally throughout the several corrugations thereof, said means including a plurality of pantograph systems of interconnected links spaced circumferentially about the joint.

10. In an expansion joint of the character having a corrugated, flexible tube and a plurality of external rings respectively fitted within the tube corrugations to limit the permissible contraction and expansion of said tube, means interconnecting said external rings and operative to uniformly distribute variations in overall length of the tube equally throughout the several corrugations thereof, said means including a pantograph system of interconnected links, and an enclosure for said linkage system operative to limit the maximum permissible extension of said system of links.

11. In an expansion joint of the character having a corrugated, flexible tube and a plurality of external rings respectively fitted within the tube corrugations to limit the permissible contraction and expansion of said tube, means interconnecting said external rings and operative to uniformly distribute variations in overall length of the tube equally throughout the several corrugations thereof, said means including a pantograph system of interconnected links, and an enclosure for said linkage system operative to limit the maximum permissible extension of said system of links, said enclosure being immovable with respect to an intermediate one of said external rings.

12. In an expansion joint of the character having a corrugated, flexible tube and a plurality of external rings respectively fitted within the tube corrugations to limit the permissible contraction and expansion of said tube, means interconnecting said external rings and operative to uniformly distribute variations in overall length of the tube equally throughout the several corrugations thereof, said means including a pantograph system of interconnected links, and means for limiting the maximum permissible extension of said system of links.

13. In an expansion joint of the character having a corrugated, flexible tube and a plurality of external rings respectively fitted within the tube to limit the permissible contraction and expansion of said tube, means operatively associated with said external rings for automatically distributing variations in overall length of the tube equally throughout the several corrugations thereof, said means including a plurality of interconnected pairs of links uniformly arranged in intersecting relation, each crossed pair of said links being provided with a central pivot mounted upon one of said external rings, and means for limiting the maximum permissible extension of said links, said last-mentioned means including a slotted member extending longitudinally of the joint and fixedly secured to one of the external rings thereof, the central pivots mounted on the remaining external rings being embraced within the slotted portion of said members.

14. In an expansion tube of the character having a corrugated, flexible tube and a plurality of external rings respectively fitted within the tube corrugations to limit the permissible contraction and expansion thereof, means operatively associated with said rings for automatically insuring simultaneous self-equalizing uniform contraction or expansion of the several corrugations of the tube whereby the contraction or expansion of each corrugation is directly proportional to the total permissible contraction or expansion of the tube and inversely proportional to the total number of corrugations thereof.

SOLOMON TOBEY.
JOHN J. MANK.
SOL ZALLEA.